(12) United States Patent
Lausberg et al.

(10) Patent No.: US 6,545,062 B2
(45) Date of Patent: Apr. 8, 2003

(54) PRODUCTION OF WATER-EXPANDABLE STYRENE POLYMERS

(75) Inventors: Dietrich Lausberg, Ludwigshafen (DE); Klaus Hahn, Kirchheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/042,210

(22) Filed: Jan. 11, 2002

(65) Prior Publication Data

US 2002/0111451 A1 Aug. 15, 2002

(30) Foreign Application Priority Data

Jan. 13, 2001 (DE) .......................................... 101 01 402

(51) Int. Cl.[7] .................................................. C08J 9/14

(52) U.S. Cl. ............................. 521/56; 521/65; 521/72; 521/82; 521/87; 521/88; 521/146; 521/910

(58) Field of Search ........................... 521/56, 82, 146, 521/65, 72, 87, 88, 910

(56) References Cited

U.S. PATENT DOCUMENTS

| 2,797,443 | A | * | 7/1957 | Carlson, Jr. .............. 521/146 X |
| 3,361,687 | A | | 1/1968 | Stahnecker |
| 5,096,931 | A | * | 3/1992 | Wittenberg et al. ............ 521/82 |
| 5,274,005 | A | * | 12/1993 | Binder et al. ........... 521/146 X |
| 6,189,354 | B1 | | 2/2001 | Späth |

FOREIGN PATENT DOCUMENTS

| WO | WO 98/01489 | 1/1998 |
| WO | WO 98/01501 | 1/1998 |
| WO | WO 99/48936 | 9/1999 |
| WO | WO 99/48956 | 9/1999 |
| WO | WO 99/48957 | 9/1999 |

* cited by examiner

*Primary Examiner*—Fred Teskin
(74) *Attorney, Agent, or Firm*—Oblon, Spivak, McClelland, Maier & Neustadt, P.C.

(57) ABSTRACT

The invention relates to a process for the production of styrene polymers containing water as expanding agent by suspension polymerization of styrene in the presence of an emulsifying auxiliary, the suspending agent being a mixture of water and an organic liquid which is water-miscible and which is virtually a non-solvent for polystyrene and has a boiling point below 100° C.

20 Claims, No Drawings

PRODUCTION OF WATER-EXPANDABLE STYRENE POLYMERS

BACKGROUND OF THE INVENTION

Field of the Invention

The invention relates to a process for the production of water-expandable styrene polymers (WEPS) by polymerization of styrene in aqueous suspension, the suspended styrene droplets comprising an emulsion of finely divided water.

Particulate expandable styrene polymers (EPS) are normally prepared by polymerization of styrene in aqueous suspension in the presence of a volatile organic expanding agent. Commonly used expanding agents are hydrocarbons, particularly pentane. For environmental reasons, pentane emitted during production and processing of EPS must be re-collected. This is an elaborate and cost-intensive procedure. Thus it is expedient to replace these organic substances in the long run by more acceptable expanding agents, for example water.

A dissertation of the University of Eindhoven "Water Expandable Polystyrene" by J. J. Crevecoeur dating from 1997 describes a process for the production of WEPS, in which water, finely distributed in styrene, is first of all emulsified by means of surface-active substances, after which the styrene is polymerized up to a conversion of 50%, the mixture is suspended in water with phase inversion and the styrene is finally polymerized to completion by means of peroxide initiators. The surface-active substances used are amphiphilic emulsifiers, eg sodium bis(2-ethylhexyl) sulfosuccinate or sodium styrenesulfonate or block copolymers comprising polystyrene blocks and poly(styrene sulfonate) blocks. All of these substances exhibit both a hydrophilic and a hydrophobic radical and are thus capable of emulsifying water in styrene. Further two-stage processes are described in WO 98/01489 and WO 01,501.

According to Patent Applications WO 99/48936, WO 99/48956 and WO 98/48957 WEPS is prepared directly in a one-stage process in aqueous suspension, use being made of thermolabile organic compounds, finely divided inorganic solid materials or EPS recyclates as emulsifying auxiliaries.

In all of said processes WEPS particles are formed which contain water as the sole expanding agent. However, these cannot be pre-expanded by conventional EPS foaming processes using steam, but instead, use must be made of air having a temperature above 100° C. or hot oil baths or hot silicone oil baths.

It is thus an object of the present invention to provide polystyrene particles containing water as expanding agent, which can be expanded at conventional prefoaming temperatures using ordinary steam.

This object is achieved by the process of the invention, in which the suspending agent is a mixture of water and an organic liquid, which is water-miscible and which is virtually a non-solvent for polystyrene and exhibits a boiling point below 100° C.

The suspension polymerization of the invention is preferably carried out in a single stage without previous mass polymerization. Known emulsifying auxiliaries can be used which cause water to be emulsified in fine distribution in the styrene droplets, eg:

a) water- and styrene-soluble inorganic solid materials having an average particle size of not more than 20 μm and a density of more than 1.1 g/cm$^3$ in an amount of from 0.1 to 15 wt %, based on the monomers, as described in WO 99/48957. Examples of suitable compounds are silica gel, silicates, metal oxides, metal hydroxides and metal salts, preference being given to from 0.2 to 5 wt % of carbon black having an average particle size of from 10 to 500 Nm and from 0.4 to 10 wt % of graphite having an average particle size (longest flake diameter) of from 1 to 30 μm and preferably from 2 to 20 μm.

b) EPS recyclate, which from its production stage still contains conventional amphiphilic coating materials, according to WO 99/48956. The EPS recyclate is added in an amount of from 5 to 30 wt %, based on the monomers, as a styrenic solution of the suspension. EPS recyclate generally contains from 0.1 to 2 wt % of protective material, eg antistatic agents, such as quaternary ammonium alkylsulfonates, aliphatic sulfonates or alkoxylated ammonium salts; antitack agents, such as metal salts of fatty acids, eg zinc stearate, further fatty acid esters and fatty acid amides; agents for reducing the cooling time, such as glycerin esters and hydrophobic esters of fatty acids or fatty alcohols, eg glycerin monostearate or tristearyl citrate.

c) thermolabile organic compounds which are soluble or dispersible in styrene and which are completely or partially decomposed or hydrolyzed to amphiphilic and/or hydrophilic compounds at elevated temperature, according to WO 99/48936. The temperature of decomposition should be above 80° C. but below the maximum polymerization temperature. They are used in an amount of from 0.1 to 5 wt %, based on the monomers. The following are suitable: halo compounds, such as hexabromocyclododecane having a temperature of decomposition of 125° C. (in the polymerization medium) further 1,1,2,2-tetrabromoethane having a temperature of decomposition of 128° C. or chlorinated paraffins having a temperature of decomposition of approximately 130° C. During decomposition or hydrolysis of these halo compounds there are formed amphiphilic hydrocarbons carrying a hydrophilic hydroxyl group, and, in addition, hydrophilic hydrogen halides. Also suitable are peroxides, such as dibenzoyl peroxide having a temperature of decomposition of 80° C., tert-butylperoxy-2-ethyl hexanoate having a temperature of decomposition of 80° C., and dicumyl peroxide having a temperature of decomposition of 110° C. During decomposition of these peroxides there are again formed amphiphilic hydrocarbons carrying carboxyl groups or hydroxyl groups. Also suitable are organic phosphorus compounds, such as aryl phosphates and derivatives thereof.

d) amphiphilic organic emulsifiers carrying both hydrophilic and hydrophobic groups, according to WO 98/01489, preferably in amounts of from 0.1 to 5 wt %, based on the monomers. Preference is given to bisalkylsulfosuccinates, sorbitol ($C_8$-$C_{20}$) carboxylates and $C_8$-$C_{20}$ alkylxylene sulfonates.

e) polar group-containing, water-soluble polymers as described in WO 98/01501, preferably in amounts of from 2 to 20 wt %, based on the monomers. Preference is given to polyvinylpyrrolidone, whilst starch, esterified starch, polyvinyl alcohol, polyvinyl acetate, polyacrylic acid, polyethylene glycols and cellulose derivatives are also suitable.

An alternative is a two-stage process in which the monomers are first of all prepolymerized in substance to a conversion of from 15 to 70% and preferably from 25 to 50% and the prepolymer, containing an emulsifying auxiliary, is suspended in the suspending agent, where it is polymerized to completion. This two-stage process is described in detail in WO 98/01489 and WO 98/01501. The emulsifying auxiliary can be present during the prepolymerization or it may be added following termination thereof. Use can be made of the aforementioned emulsifiers, preferably those mentioned under d) and e). Prepolymerization is carried out under conventional mass polymerization conditions, preferably at from 80° to 120° C. in the presence of free radical initiators. After achieving a conversion of from 15 to 70% and preferably from 25 to 50% the viscous prepolymerization solution is suspended in the suspending agent. The water which will subsequently act as expanding agent may be added during prepolymerization.

In both cases polymerization of the invention is completed in suspension, the suspending agent being a mixture of water and an organic liquid, preferably in a ratio, by weight, of from 99:1 to 50:50 and more preferably from 95:5 to 75:25. The organic liquid should be water-miscible, and polystyrene should be virtually or, preferably, absolutely insoluble therein. Its boiling point should be below 100° C. and in particular between 40° to 80° C. Suitable organic liquids are $C_1$-$C_3$ alcohols, $C_3$-$C_5$ ketones and $C_1$-$C_5$ aldehydes. Particular preference is given to ethanol. Furthermore, the suspending agent can contain $C_4$-$C_7$ alkanes, particularly pentane, preferably in amounts of up to 3 wt %, based on the monomers.

In the suspension polymerization of the invention the monomer used is preferably styrene alone. However, up to 20% of its weight can be replaced by other ethylenically unsaturated monomers, such as alkyl styrenes, divinyl benzene, acrylonitrile, 1,1-diphenylethylene or α-methylstyrene.

When carrying out the suspension polymerization, conventional auxiliaries, such as suspension stabilizers, free radical initiators, flameproofing agents, chain-transfer agents, expanding agents, nucleation agents and plasticizers, can be added. It is advantageous to use, as suspension stabilizers, inorganic Pickering dispersing agents, eg magnesium diphosphate or tricalcium orthophosphate, together with small amounts of alkyl sulfonates. Preferred flameproofing agents are organic bromine compounds, such as hexabromocyclododecane, which are added in amounts of from 0.1 to 2 wt %, based on the monomers.

It is advantageous to carry out polymerization in the presence of from 1 to 30 wt % and preferably from 3 to 15wt % of polystyrene, which is advantageously used in the form of a styrenic solution. Instead of pure polystyrene, polystyrene recyclate may alternatively be used.

The emulsifying auxiliary is preferably added at the very start of the suspension polymerization; alternatively, it can be metered in during polymerization until a conversion of 90% has been reached.

The suspension polymerization is advantageously carried out at two temperature levels, use being made of two peroxide initiators which decompose at different temperatures. The suspension is first of all heated to 80° to 90° C., in which case the first peroxide, eg dibenzoyl peroxide, decomposes and polymerization starts. The temperature is then allowed to slowly rise to from 100° to 140° C. During this operation, the second peroxide, eg dicumyl peroxide or di-tert-butyl perbenzoate decomposes.

During the suspension polymerization the batch should be stirred vigorously. For this reason and due to the assistance of the emulsifying auxiliary, water is emulsified in fine distribution in the suspended styrene droplets or prepolymer droplets.

The expandable styrene polymers manufactured by the process of the invention contain, as expanding agents, from 2 to 20 wt % and preferably from 5 to 15 wt % of water and from 0.1 to 10 wt % and preferably from 0.2 to 10 wt % of the organic liquid, and optionally up to 3 wt % and in particular from 0.2 to 2.5 wt % of a $C_4$-$C_7$ alkane, preferably pentane. The organic liquid lowers the boiling point of the expanding agent and has the effect that the WEPS particles can be expanded with steam having a temperature of from 100° to 110° C. The polystyrene-miscible alkane lowers the softening point of the styrene and thus also assists in decreasing the foaming temperature.

The particle size of the WEPS particles is from 0.2 to 5 mm and preferably from 0.5 to 2 mm. They can be expanded to foamed particles with steam in conventional preexpanders, and expansion can be carried out once or a number of times.

The expanded particles of WEPS can, like conventional expanded particles of EPS, be welded to form foamed panels, foamed blocks or foamed shaped articles having densities of from 10 to 100 g/L, which can be used as insulating or packaging materials.

In the following example, the percentages are by weight.

EXAMPLE

In 17.03 kg of styrene there are dissolved 2.55 kg of polystyrene (PS 158 K sold by BASF), and 340 g (2%) of powdery graphite F, Kropfmuehle KG, average particle size 4 μm, are uniformly suspended in the solution in admixture with 59.6 g of dicumyl peroxide and 20.4 g of dibenzoyl peroxide. The organic phase is introduced into a mixture of 18.5 kg of water and 1.5 kg of ethanol in a stirred tank having a capacity of 50 L. The aqueous ethanol phase contains 69.8 g of sodium diphosphate and 129.5 g of magnesium sulphate as filling. The suspension is heated to 80° C. with stirring. The stirrer speed was in this case 140 rpm. After 140 minutes, 3.51 g of alkyl sulfonate are added. Finally, polymerization is carried to completion at 134° C. Following separation of the aqueous phase there are obtained bead-shaped granules containing 8% of water and 0.6% of ethanol.

The product could be expanded with steam having a temperature of 105° C. During this operation the product expanded to 12 times its original bulk density of ca 600 g/L. The pre-expanded product was then dried and expanded with steam in a second expansion step to a bulk density below 12 g/L.

What is claimed is:

1. A process comprising polymerizing styrene and, optionally, one or more comonomers, in suspension in the presence of a suspending agent, wherein droplets of suspended styrene comprise emulsified water and an emulsifying auxiliary, wherein the suspending agent is a mixture of water and an organic liquid, and wherein the organic liquid is water-miscible, virtually a non-solvent for polystyrene and has a boiling point below 100° C.

2. The process of claim 1, wherein the polymerization is carried out in a single stage without previous mass polymerization.

3. The process of claim 2, wherein the emulsifying auxiliary is selected from the group consisting of a) an inorganic solid material which is insoluble in water and styrene and has an average particle size of not more than 20 μm and a density of more than 1.1 g/cm$^3$, b) a recycled foam comprising expanded polystyrene particles (EPS recyclate) which from its production stage comprises a conventional, amphiphilic protective material, c) a thermolabile organic compound which is soluble or dispersible in styrene and is partially or completely decomposed or hydrolyzed at elevated temperature to amphiphilic compounds, hydrophilic compounds or a mixture thereof, d) an amphiphilic organic emulsifier carrying both hydrophilic and hydrophobic groups, and e) a polar group-containing, water-soluble polymer.

4. The process of claim 1, comprising first polymerizing styrene in substance to a conversion of from 15 to 70% to form a prepolymer comprising an emulsifying auxiliary, suspending the prepolymer in the suspending agent, and then polymerizing to completion.

5. The process of claim 4, wherein the emulsifying auxiliary is an amphiphilic organic emulsifier having both a hydrophilic and a hydrophobic group, or a polymer having at least one polar group.

6. The process of claim 1, wherein the suspending agent is a mixture of water and the organic liquid in a ratio, by weight, of from 99:1 to 50:50.

7. The process of claim 1, wherein the organic liquid is a $C_1$-$C_3$ alcohol, a $C_3$-$C_5$ ketone or a $C_1$-$C_5$ aldehyde.

8. A particulate, expandable styrene polymer comprising, an expanding agent comprising from 2 to 20 wt % of water, from 0.1 to 10 wt % of an organic liquid which is water miscible, virtually a non-solvent for polystyrene and has a boiling point below 100° C., and optionally up to 3 wt % of a $C_4$-$C_7$ alkane.

9. The polymer of claim 8, wherein the expanding agent comprises from 5 to 15 wt % of water, from 0.2 to 10 wt % of ethanol, and from 0.2 to 2.5 wt % of pentane.

10. The process of claim 1, wherein the emulsifying auxiliary is selected from the group consisting of silica gel, silicates, metal oxides, metal hydroxides and metal salts.

11. The process of claim 1, wherein the emulsifying auxiliary is carbon black having an average particle size of from 10 to 500 nm.

12. The process of claim 1, wherein the emulsifying auxiliary is graphite having an average particle size of from 1 to 30 $\mu$m.

13. The process of claim 12, wherein the graphite is present in an amount of 0.4 to 10 wt % based on the total amount of styrene and optional comonomers.

14. The process of claim 11, wherein the carbon black is present in an amount of 0.2 to 5 wt % based on the total weight of styrene and the comonomers.

15. The process of claim 1, wherein the organic liquid is ethanol.

16. The process of claim 1, wherein polystyrene is insoluble in the organic liquid.

17. The process of claim 1, further comprising expanding the polymerized monomers with steam.

18. The process of claim 1, wherein the suspending agent is a mixture of water and the organic liquid in a ratio, by weight, of from 95:5 to 75:25.

19. The process of claim 1, wherein the polymerization is carried out in the presence of a first peroxide initiator decomposing at a temperature of from 80 to 90° C. and a second peroxide initiator decomposing at a temperature of from 100 to 140° C.

20. The process of claim 1, wherein the polymerization is carried out in the presence of from 1 to 30 wt % of polystyrene in the form of a styrenic solution.

* * * * *